Aug. 15, 1944.    P. E. SLIGHTAM    2,356,120
UPENDING DEVICE
Filed Oct. 31, 1942    3 Sheets-Sheet 1
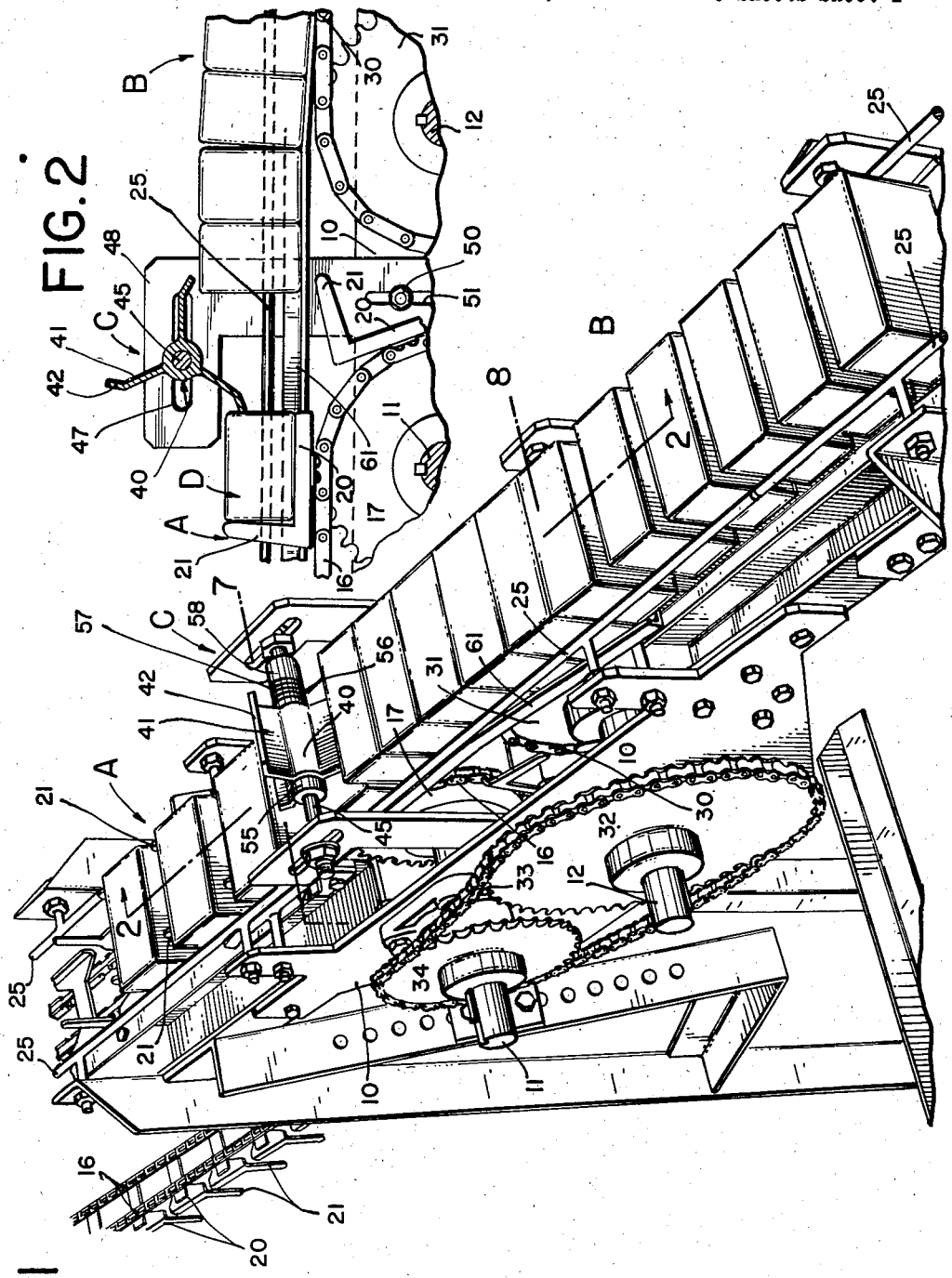
INVENTOR
Paul E. Slightam
BY Arthur R. Wylie ATTY.

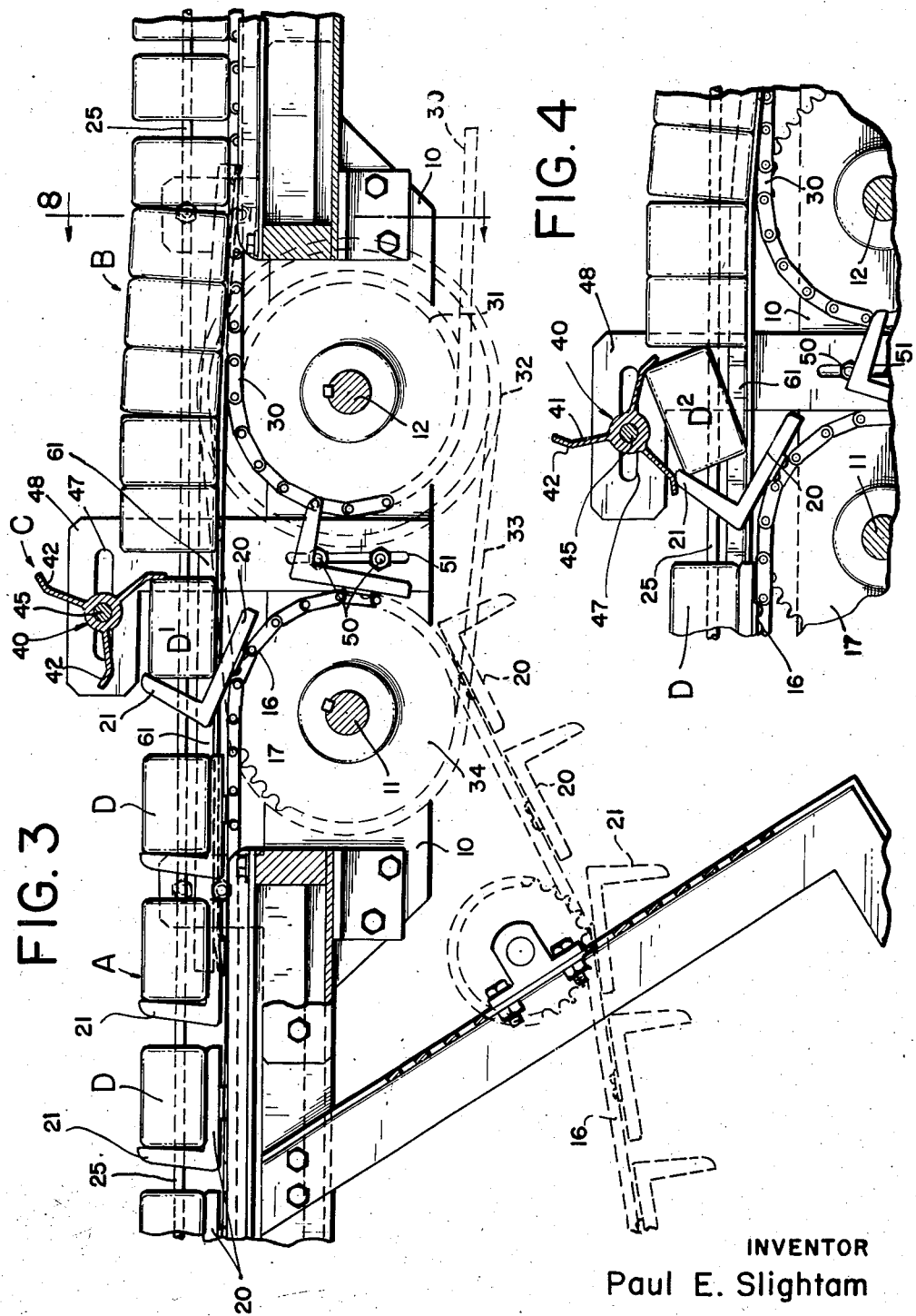

Aug. 15, 1944. P. E. SLIGHTAM 2,356,120
UPENDING DEVICE
Filed Oct. 31, 1942 3 Sheets-Sheet 3
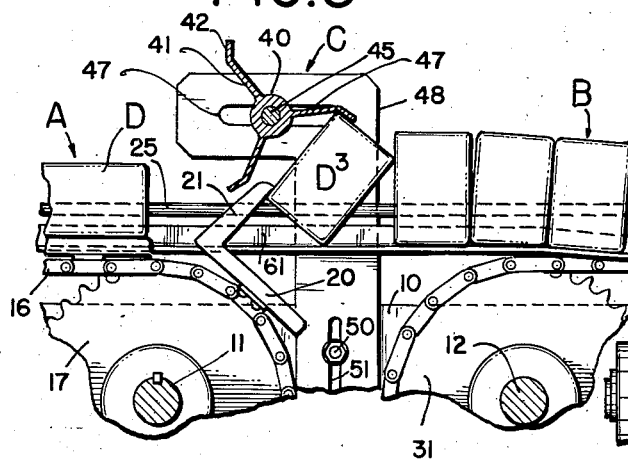
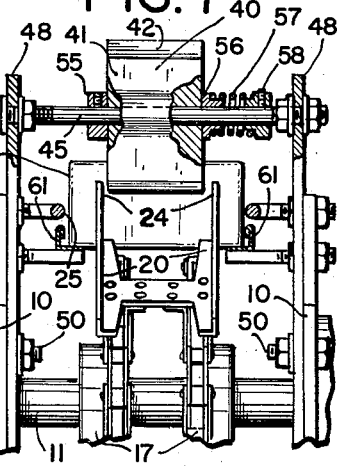
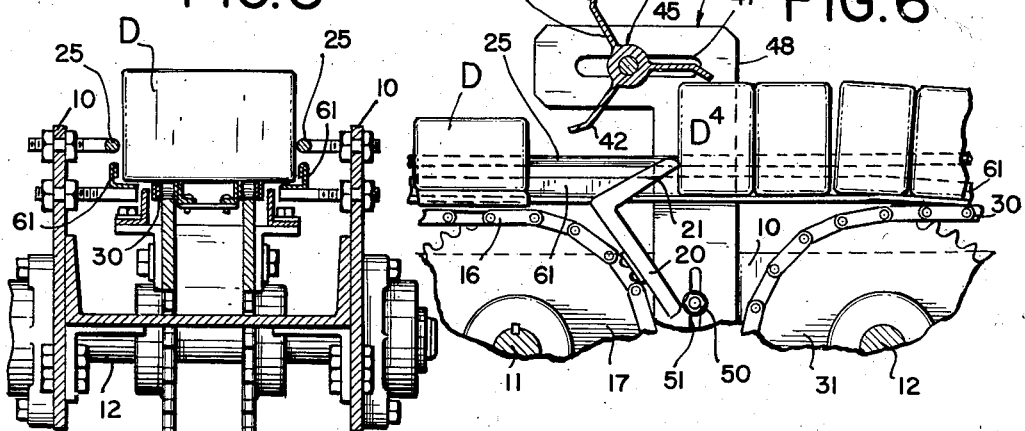
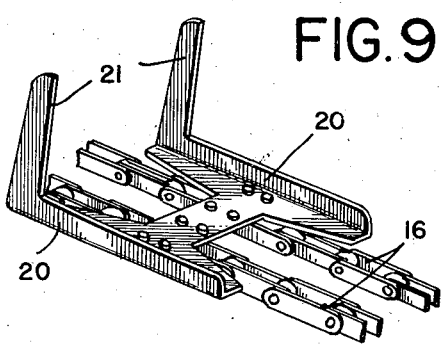
INVENTOR
Paul E. Slightam
BY Arthur R. Wylie ATTY.

Patented Aug. 15, 1944

2,356,120

UNITED STATES PATENT OFFICE 2,356,120

UPENDING DEVICE

Paul E. Slightam, Palos Heights, Ill., assignor to General Mills, Inc., a corporation of Delaware Application October 31, 1942, Serial No. 464,051

9 Claims. (Cl. 198—33)

This invention relates to a device for upending cartons as they pass through a machine so that they take up less space and I am able to get a larger number of cartons per foot of length of the machine thereby permitting the use of a relatively shorter machine. This is particularly desirable where it is necessary to keep the cartons in the machine for a definite period of time as where cooling takes place.

An object of this invention is to provide a simple and efficient means for upending cartons.

This and other objects as will hereinafter appear are accomplished by this invention which is fully described in the following specification and shown in the accompanying drawings in which Figure 1 is a partial perspective of the meeting ends of two aligned conveyors with the upending device located between them;

Figs. 2, 3, 4, 5 and 6 are partial longitudinal sections taken on the line 2—2 of Fig. 1 showing the upending device in various positions;

Fig. 7 is a partial transverse vertical section on the line 7 of Fig. 1;

Fig. 8 is a similar section on the line 8 of Fig. 1; and

Fig. 9 is a partial perspective view of the first conveyor showing one of the flights.

The embodiment illustrated comprises two aligned conveyors A and B with the upending device C placed between them. A frame 10 connects the two conveyors and carries suitable bearings (not shown) in which is journalled a head shaft 11 of the conveyor A and a tail shaft 12 of conveyor B.

The conveyor A is preferably driven from the opposite end by means not shown and consists essentially of two spaced chains 16 running over spaced sprockets 17 which are keyed on the shaft 11 and carrying a series of flights having horizontal members 20 on which is adapted to rest a carton D and having upstanding fingers 21 adapted to extend up back of the carton to move it forward and to assist in the upending operation as will presently be described.

Guide rails 25 are adjustably mounted one at each side of both conveyors A and B so as to guide the cartons in their passage through the machine.

The conveyor B has two similar spaced chains 30 driven by two spaced sprockets 31 keyed on the shaft 12. This shaft is driven by means of a sprocket 32 (Fig. 1) driven by a chain 33 running over a sprocket 34 on the shaft 11. It will be noted that the sprocket 32 is larger than the sprocket 34 so that the speed of the conveyor B is considerably reduced from that of conveyor A.

The upending device shown generally as C consists of a resistance member which is a sort of paddle wheel 40 having a series of radial vanes 41, preferably three in number, the outer ends of which are bent at 42 in a clockwise direction. This member is rotatably mounted on a rod 45 (Figs. 5 and 7) which is adjustably secured at its ends in slots 47 in spaced supporting plates 48 which are adjustably secured to the frame members 10 by suitable bolts 50 passing through vertical slots 51 in the supporting plates 48 to permit of vertical adjustment. The slots 47 are horizontal to permit of horizontal adjustment of the resistance member or paddle wheel 40 with respect to the shaft 11 of conveyor A.

The paddle wheel 40 is rotatably mounted on the rod 45 and is guided at one end by means of a collar 55 adjustably secured thereon. A washer 56 at the opposite side of the paddle wheel is slidable on the rod 45 and is pressed by means of a spring 57, the pressure of which is adjusted by means of a collar 58. Angle guides 61 extend from one conveyor to the other so as to carry the packages from conveyor A to conveyor B. They are carried on conveyor B in any suitable manner, the packages in this instance resting directly on the chain of conveyor B. As the cartons D approach the upending device, as shown in Fig. 6, they lie horizontal and engage a depending arm 42. As they advance they move the paddle wheel from the position of Fig. 6 to that of Fig. 3 at which time the flight of conveyor A is starting to pass around the sprocket wheel 17.

The fingers 21 now press both forwardly and downwardly on the rear end of the package $D^1$ and as the fingers 21 rotate, the package moves through the position $D^2$ of Fig. 4, and $D^3$ of Fig. 5 to the upright position $D^4$ of Fig. 6 after which the fingers 21 pass down out of contact with the packages and leaving the paddle wheel in the position shown in Fig. 6 ready to receive the next package. The paddle wheel thus offers a slight resistance to the upper portions of the advancing cartons. This resistance may be adjusted by the position of the collar 58 which applies pressure on the spring 57. The coöperation between this resisting force applied to the front of the carton and the propelling force applied by the fingers 21 to the rear of the carton causes it to move through the positions illustrated.

Thus it will be seen that I have provided a very simple and efficient form of device for rotating a package through 90 degrees from a horizontal to a vertical position. As a result, many more packages can be carried by conveyor B for a given length of conveyor and consequently the speed of conveyor B can be reduced considerably below that of conveyor A as has been done in this instance.

While I have shown and described but a single embodiment of my invention, it is to be understood that it is capable of many modifications. Changes, therefore, may be made which do not depart from the spirit and scope of my invention as disclosed in the appended claims.

I claim as my invention:

1. Mechanism for upending rectangular cartons from a horizontal to a vertical position comprising a conveyor having flights each adapted to propel a carton, a plate at the tail end of the conveyor, and a resistance member rotatable about an axis located above the path of the cartons and above the plate, said member having radial arms each adapted to engage the advancing upper edge of the forward face of a carton and to offer resistance so that it will rock the carton backwards as it is propelled by the flight across the plate beneath the rotatable member.

2. Mechanism for upending rectangular cartons from a horizontal to a vertical position comprising a conveyor having flights each adapted to propel a carton, a plate at the tail end of the conveyor, and a resistance member rotatable about an axis located above the path of the cartons and above the plate, said member having three spaced radial arms each adapted to engage the advancing upper edge of the forward face of a carton and to offer resistance so that it will rock the carton backwards as it is propelled by the flight across the plate beneath the rotatable member.

3. Mechanism for upending rectangular cartons from a horizontal to a vertical position comprising a conveyor having flights each adapted to propel a carton, a plate at the tail end of the conveyor, and a resistance member rotatable about an axis located above the path of the cartons and above the plate, said member having three spaced radial arms, each radial arm being bent and adapted to engage the advancing upper edge of the forward face of a carton and to offer resistance so that it will rock the carton backwards as it is propelled by the flight across the plate beneath the rotatable member.

4. Mechanism for upending rectangular cartons from a horizontal to a vertical position comprising a conveyor having a head shaft and having flights each adapted to propel a carton, a plate at the tail end of the conveyor, and a resistance member rotatable about an axis located above the path of the cartons and above the plate, said member having three spaced radial arms, each radial arm being bent and adapted to engage the advancing upper edge of the forward face of a carton and to offer resistance so that it will rock the carton backwards as it is propelled by the flight across the plate beneath the rotatable member as the flight passes around the head shaft.

5. Mechanism for upending rectangular cartons from a horizontal to a vertical position comprising a conveyor having flights each adapted to propel a carton, a plate at the tail end of the conveyor, a resistance member rotatable about an axis located above the path of the cartons and above the plate, said member having radial arms each adapted to engage the advancing upper edge of the forward face of a carton and to offer resistance so that it will rock the carton backwards from a horizontal to a vertical position as it is propelled by the flight across the plate beneath the rotatable member, a second conveyor adapted to receive cartons from said plate and driven at a slower speed than the first-mentioned conveyor since the cartons occupy less space longitudinally of the second conveyor than the first, and guides at the sides of the cartons.

6. Mechanism for upending rectangular cartons from a horizontal to a vertical position comprising a conveyor having a head shaft and having flights each adapted to propel a carton, a plate at the tail end of the conveyor, a resistance member rotatable about an axis located above the path of the cartons and above the plate, said member having three spaced radial arms, each radial arm being bent and adapted to engage the advancing upper edge of the forward face of a carton and to offer resistance so that it will rock the carton backwards as it is propelled by the flight across the plate beneath the rotatable member as the flight passes around the head shaft, a second conveyor adapted to receive cartons from said plate and driven at a slower speed than the first-mentioned conveyor, and guides at the sides of the cartons.

7. Mechanism for upending rectangular cartons from a horizontal to a vertical position comprising a conveyor having flights each adapted to propel a carton, a plate at the tail end of the conveyor, and a resistance member rotatable about an axis located above the path of the cartons and above the plate, said member having radial arms each adapted to engage the advancing upper edge of the forward face of a carton and to offer resistance so that it will rock the carton backwards as it is propelled by the flight across the plate beneath the rotatable member, the flight extending substantially to the top of the carton when in the horizontal position.

8. In a device for upending cartons, a conveyor having flights for propelling a succession of rectangular cartons in horizontal position with their tops in a given plane, a rotatable resisting member mounted to rotate about an axis above the given plane and having a plurality of radial arms each having forwardly extending portions adapted to engage the upper forward edge of a carton in order to rock it backward into a vertical position, and guides for the ends of the cartons.

9. Mechanism for upending rectangular cartons from a horizontal to a vertical position comprising a conveyor having flights each adapted to propel a carton, a plate at the tail end of the conveyor, and a resistance member rotatable about an axis located above the path of the cartons and above the plate, said member having radial arms each adapted to engage the advancing upper edge of the forward face of a carton and to offer yielding resistance so that it will rock the carton backwards as it is propelled by the flight across the plate beneath the rotatable member, the flights having spaced fingers extending substantially to the top of the carton when in the horizontal position and positioned at the sides of the resistance member so as to pass the same.

PAUL E. SLIGHTAM.